Patented Mar. 13, 1934

1,950,543

UNITED STATES PATENT OFFICE 1,950,543

HYDROXY-3.5-DI-IODO PYRIDINE-2-CARBOXYLIC ACID

Max Dohrn, Berlin-Charlottenburg, and Paul Diedrich, Finkenkrug, near Berlin, Germany, assignors to Schering-Kahlbaum A. G., Berlin, Germany No Drawing. Application September 8, 1932, Serial No. 632,268. In Germany September 22, 1931

3 Claims. (Cl. 260—42)

Our invention relates to new compounds belonging to the class of halogen substituted pyridine carboxylic acids. It has particular reference to iodine substituted hydroxypyridine carboxylic acids, which have been found to be of great value in the manufacture of contrast agents for X-ray diagnosis.

We have found that if 4- or 6-hydroxypyridine-mono- or polycarboxylic acids, which contain a carboxyl group in $m$-position relative to the hydroxyl group are acted upon with iodine in alkaline solution, 4- or 6-hydroxy-3.5-diiodo-pyridine-2-carboxylic acids are obtained.

Preferably the alkaline solutions, saturated with iodine, of the 4- or 6-hydroxypyridine-mono-or polycarboxylic acids are repeatedly and alternatingly acidified and rendered alkaline under boiling. This treatment causes those carboxyl groups, which are not in $m$-position to the hydroxyl group, to be replaced by iodine. We obtain in this manner acids, having the formula

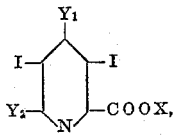

wherein X is the typical hydrogen atom, which may be replaced by metals, more especially by alkali-forming metals, while $Y_1$ is the hydroxyl group and $Y_2$ hydrogen, or vice versa, $Y_1$ being hydrogen, $Y_2$ the hydroxyl group.

If X is hydrogen, the products are colourless crystallizing acids, which are insoluble in cold water, dissolve only with difficulty in hot water and hot alcohol and decompose at temperatures above 250° C. under separation of iodine. By replacing the typical hydrogen atom by a metal, there are obtained salts. The alkali metal salts very readily dissolve in water even in the cold.

In practising our invention we may for instance proceed as follows:—

*Example 1: 4-hydroxy-3.5-diiodopyridine-2-carboxylic acid*

In a boiling solution of 13.9 grams 4-hydroxy-pyridine-2-carboxylic acid in 750 ccm. water, to which have been added 25 grams caustic potash, are dissolved 56 grams iodine. The solution, which is kept boiling, is acidified by adding hydrochloric acid drop by drop, whereupon the acid is neutralized and the solution rendered slightly alkaline by adding caustic potash. This alternate addition of alkali and acid is repeated five times. The acid solution is filtered while still warm and the filtrate discoloured by adding sulfur dioxide. Mineral acid is added to render the filtrate strongly acid and after cooling the 4-hydroxy-3.5-diiodopyridine-2-carboxylic acid separates out as a colourless precipitate formed of fine crystals. The acid thus obtained still contains small quantities of 4-hydroxy-3-iodopyridine-6-carboylic acid, which can be removed by boiling the precipitate with some water which, when hot, dissolves the monoiodine compound. The 4-hydroxy-3.5-diiodopyridine-2-carboxylic acid, which is thus purified, decomposes when heated to 250° C. under discoloration and splitting off of iodine. It is insoluble in cold water, dissolves only with difficulty in hot water and hot alcohol and forms with alkali-forming metals, such as sodium, lithium etc. readily soluble alkali metal salts.

*Example 2: 6-hydroxy-3.5-diiodopyridine-2-carboxylic acid*

13.9 grams 6-hydroxy-2-pyridine-carboxylic acid are substituted with iodine as described with reference to Example 1. The 6-hydroxy-3.5-diiodopyridine-2-carboxylic acid thus obtained is purified by recrystallization from a large quantity of hot amyl alcohol. It forms small colourless needles arranged in star-fashion, which are discoloured at temperatures above 240° C. and decompose at 272° C. under separation of iodine. The acid is insoluble in cold water, dissolves with difficulty in hot water and hot alcohol and forms readily soluble alkali metal salts.

*Example 3: 6-hydroxy-3.5-diiodopyridine-2-carboxylic acid*

18.3 grams 6-hydroxy-pyridine-2.3-dicarboxylic acid are substituted with iodine as described with reference to Example 1. At each acidulation carbon dioxide is liberated. The final product thus obtained is identical with the 6-hydroxy-3.5-diiodopyridine-2-carboxylic acid described with reference to Example 2.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. Iodo-substituted hydroxypyridine carboxylic acids having the formula

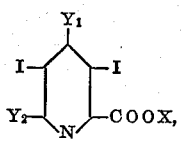

wherein X is the typical hydrogen atom, which may also be replaced by an alkali metal, while $Y_1$ or $Y_2$ is the hydroxyl group and the other is hydrogen, these compounds, if X is hydrogen, being fine colourless crystals dissolving only with difficulty in cold water and being decomposed under separation of iodine, when heated above 250° C., while, if X is an alkali-forming metal, they are salts which very readily dissolve in water.

2. 6-hydroxy-3.5-diiodopyridine-2-carboxylic acid having the formula

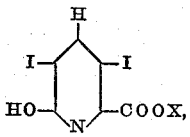

wherein X is the typical hydrogen atom, which may also be replaced by an alkali metal, the compound, if X is hydrogen, being a colourless acid crystallizing in small needles arranged in star-fashion, which are insoluble in cold water, dissolve only with difficulty in hot water and in hot alcohol, are discoloured when heated to 240° C. and decompose under separation of iodine at 272° C., while, if X is an alkali-forming metal, the compound is a salt which very readily dissolves in water.

3. The 4-hydroxy-3.5-diiodopyridine-2-carboxylic acid having the formula

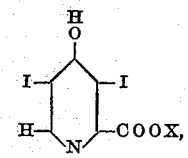

wherein X is the typical hydrogen atom, which may also be replaced by an alkali metal, the compound, if X is hydrogen, being a colourless acid insoluble in cold water, and dissolving with difficulty in hot water and hot alcohol, being decomposed under separation of iodine, if heated to 250° C., while, if X is an alkali-forming metal, the compound is a salt which readily dissolves in water.

MAX DOHRN.
PAUL DIEDRICH.